United States Patent [19]

Kajii et al.

[11] Patent Number: 5,244,081
[45] Date of Patent: Sep. 14, 1993

[54] CONVEYOR APPARATUS FOR HORIZONTALLY FEEDING SHEET MATERIAL

[75] Inventors: Masuhide Kajii; Atsushi Okai, both of Osaka, Japan

[73] Assignee: Nippon Sheet Glass Co., Ltd., Osaka, Japan

[21] Appl. No.: 851,053

[22] Filed: Mar. 13, 1992

[30] Foreign Application Priority Data

Mar. 20, 1991 [JP] Japan .................................. 3-081563

[51] Int. Cl.$^5$ ............................................. B65G 13/07
[52] U.S. Cl. ................................... 198/790; 198/781
[58] Field of Search .............. 198/789, 790, 781, 782; 65/273, 349, 350

[56] References Cited

U.S. PATENT DOCUMENTS

| | | |
|---|---|---|
| Re. 32,497 | 9/1987 | Canfield . |
| 633,572 | 9/1989 | Cromwell .......................... 198/790 |
| 3,643,788 | 2/1972 | Werntz ............................... 198/781 |
| 4,300,937 | 11/1981 | Rhonehouse ................... 198/790 X |
| 4,332,608 | 6/1982 | Rhonehouse ................... 198/789 X |
| 4,473,149 | 9/1984 | Vogt et al. ........................ 198/781 |
| 4,488,639 | 12/1984 | Vogt et al. ......................... 198/781 |
| 4,725,300 | 2/1988 | McMaster ........................... 65/273 |
| 4,832,184 | 5/1989 | De Good ....................... 198/789 X |
| 4,957,532 | 9/1990 | Jacobson et al. . |
| 5,105,935 | 4/1992 | Kohl ............................. 198/789 X |

FOREIGN PATENT DOCUMENTS

3343653 6/1985 Fed. Rep. of Germany .
3-16928 1/1991 Japan .

*Primary Examiner*—Robert P. Olszewski
*Assistant Examiner*—Cheryl L. Gastineau
*Attorney, Agent, or Firm*—Merchant, Gould, Smith, Edell, Welter & Schmidt

[57] ABSTRACT

A conveyor apparatus for feeding a sheet material such as a sheet of glass in a heating furnace includes an array of feed rolls for feeding the sheet material in a feeding direction, the feed rolls having respective axes extending in a direction transverse to the feeding direction. A motor is disposed on a side of the array of feed rolls. An array of drive support rollers is disposed on the side of the array of feed rolls and operatively connected to the motor for rotation thereby. Each of the drive support rollers commonly supports adjacent two of the feed rolls for rotating the adjacent two feed rolls.

5 Claims, 8 Drawing Sheets

CONVEYOR APPARATUS FOR HORIZONTALLY FEEDING SHEET MATERIAL

BACKGROUND OF THE INVENTION

1. Field of the Invention

The present invention relates to a conveyor apparatus for feeding a sheet material such as a sheet of glass, and more particularly to a conveyor apparatus for horizontally feeding, at uniform speed, a sheet material such as sheet glass that has been heated in a heating furnace.

2. Description of the Relevant Art

There have been known conveyor apparatus for horizontally feeding sheet glass at uniform speed in a heating furnace.

One typical sheet glass conveyor comprises an array of feed rolls having their axes extending perpendicularly to the direction in which the sheet glass is fed. The feed rolls have upper ends that jointly serve as a horizontal feed plane in which the glass is fed.

The feed rolls may be rotated at uniform speed by different mechanisms. According to one mechanism, gears are attached to respective ends of the feed rolls, and a chain driven by a motor and a train of gears are operatively coupled to the gears on the feed rolls for rotating the feed rolls. Another mechanism comprises a chain or an endless belt driven by a motor, with the feed rolls placed on the chain or the endless belt.

The former rotating mechanism is disadvantageous in that when the sheet glass is to be fed at a different speed, there is developed a backlash between the gears or the gears and the chain, causing the sheet glass to slip against the feed rolls. As a result, the sheet glass which has been softened with heat tends to be scratched or damaged by the feed rolls. The latter rotating mechanism is free of the backlash problem. However, it is tedious and time-consuming to locate any defective or damaged feed roll among the many feed rolls employed, and the sheet glass being fed is still liable to be scratched or damaged by a damaged feed roll.

A sheet glass conveyor that has been proposed to solve the aforesaid problems of the conventional sheet glass conveyor apparatus is disclosed in Japanese laid-open patent publication No. 3-16928.

The disclosed sheet glass conveyor comprises an array of feed rolls whose ends are placed on an endless belt. The feed rolls are individually shiftable between upper and lower positions by respective support rollers.

The proposed sheet glass conveyor does not suffer the backlash problem, and allows damaged rolls to be located and replaced easily. However, the feed rolls may not be rotated at different speeds because of the slippage developed between the feed rolls and the endless belt, with the result that the sheet glass that has been softened with heat is apt to be scratched.

SUMMARY OF THE INVENTION

It is an object of the present invention to provide a sheet material conveyor apparatus which rotates an array of feed rolls at uniform speed, prevents a sheet material such as sheet glass from being scratched when it is fed by the feed rolls, allows damaged feed rolls to be located with ease, and also permits feed rolls to be replaced easily.

According to the present invention, there is provided a conveyor apparatus for feeding a sheet material, comprising an array of feed rolls for feeding a sheet material in a feeding direction, the feed rolls having respective axes extending in a direction transverse to the feeding direction, a motor disposed on a side of the array of feed rolls, and an array of drive support rollers disposed on the side of the array of feed rolls and operatively connected to the motor for rotation thereby, each of the drive support rollers commonly supporting adjacent two of the feed rolls for rotating the adjacent two feed rolls.

Since the rotative power from each of the drive support rollers is transmitted to two adjacent feed rolls to rotate them, the feed rolls are rotated at uniform speed.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
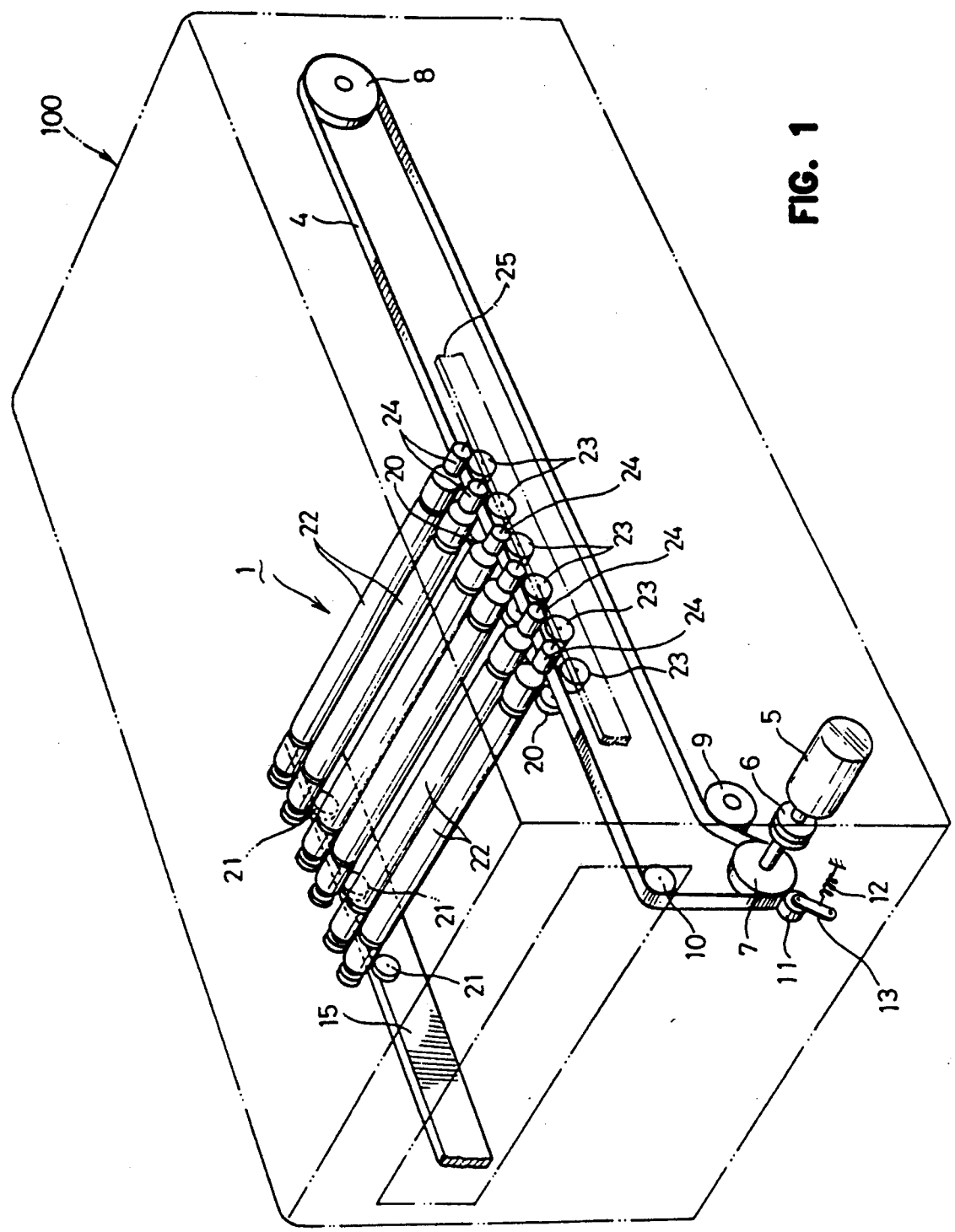
FIG. 1 is a fragmentary perspective view of a horizontal sheet material conveyor apparatus according to an embodiment of the present invention.
Figure 3:
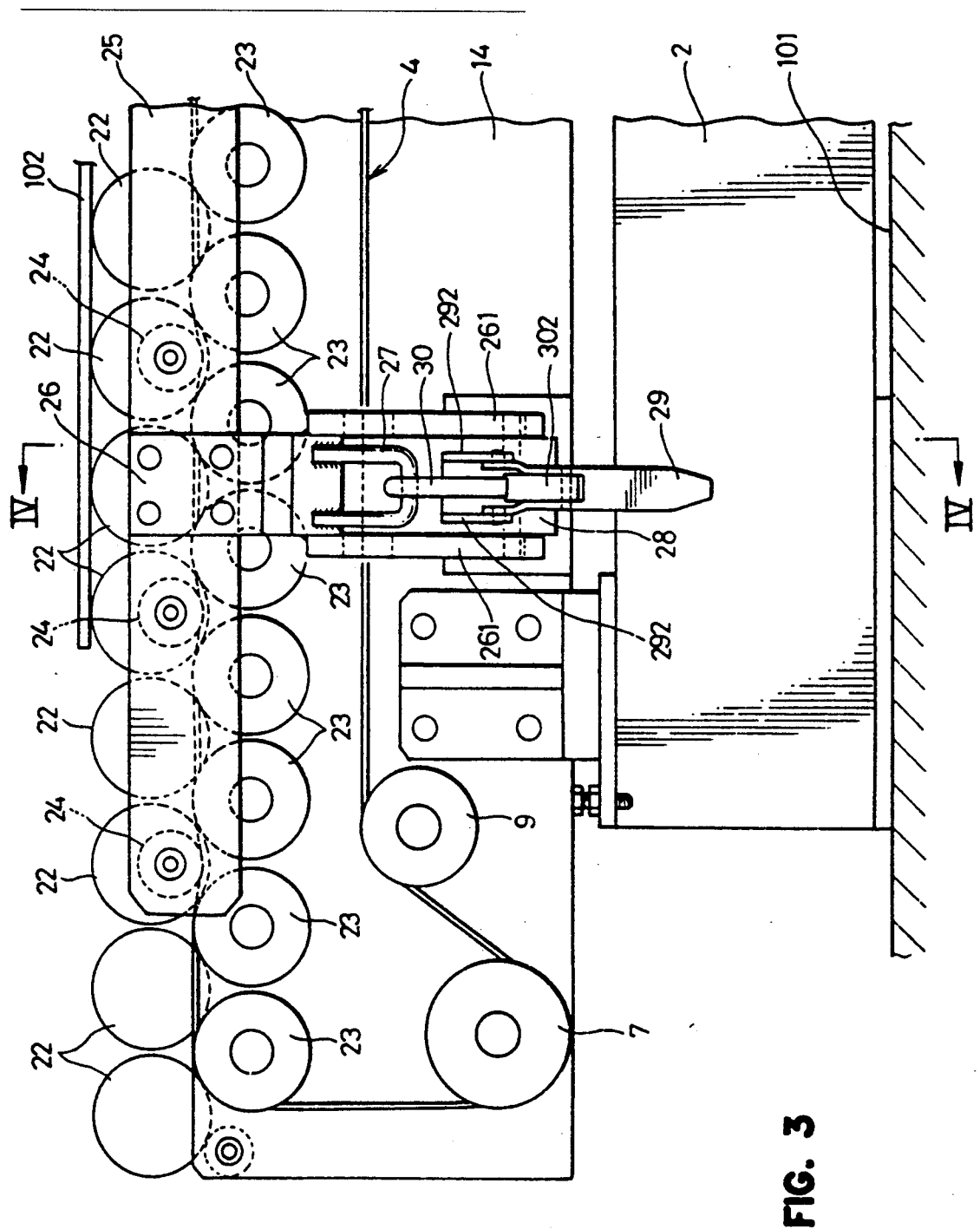
FIG. 3 is a side elevational view of the horizontal sheet material conveyor apparatus as viewed in the direction indicated by the arrow III.
Figure 4:
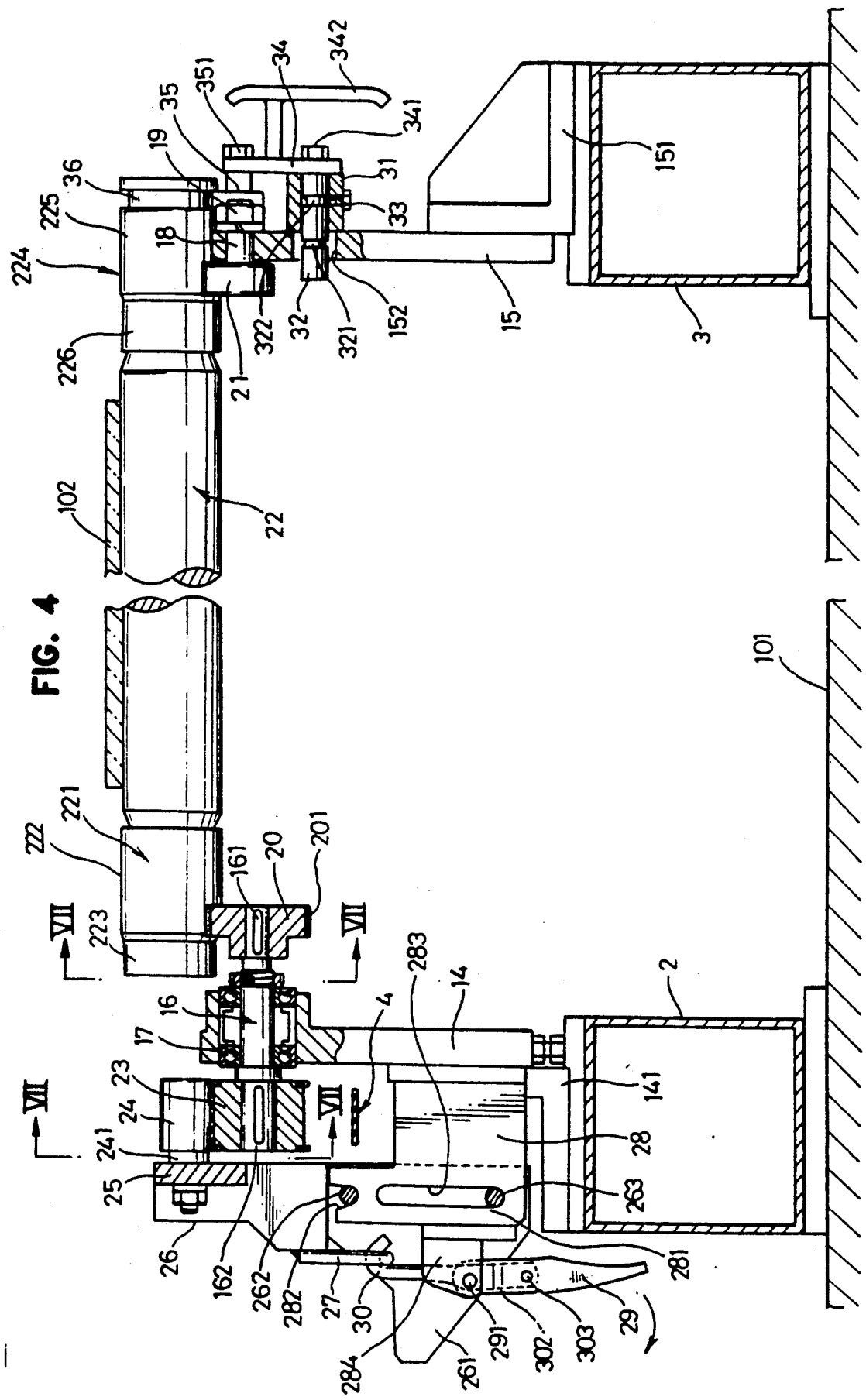
FIG. 4 is a cross-sectional view taken along line IV—IV of FIG. 3.

As shown in FIGS. 3 and 4, a horizontal sheet material conveyor apparatus 1 includes a pair of laterally spaced lower support frames 2, 3 installed on a bottom 101 of a heating furnace 100 (see FIG. 1). The support frames 2, 3 extend in a direction (hereinafter referred to as a "feeding direction") in which a sheet of glass 102 is fed in the heating furnace 100 while the sheet of glass 102 is being heated in the heating furnace 100.

The horizontal sheet material conveyor apparatus 1 has a flat endless belt 4 of steel disposed above and extending along the frame 2. As shown in FIG. 1, the endless belt 4 is trained around a drive pulley 7 that is rotatable by an electric motor 5 through a coupling 6 and a driven pulley 8 that is spaced from the drive pulley 7 in the feeding direction.

A tension pulley 9 is held against the lower surface of the lower run of the endless belt 4 near the drive pulley 7 (see also FIG. 3). The endless belt 4 is also trained around a guide pulley 10 held against the lower surface of the upper run of the endless belt 4 upwardly of the tension pulley 9. A presser roller 11 is positioned radially outwardly of the drive pulley 7 and supported on a stay 13. The stay 13 is normally urged by a tension spring 12 to cause the presser roller 11 to press the endless belt 4 against the drive pulley 7 for preventing the endless belt 4 from slipping against the drive pulley 7.

Instead of the flat endless belt 4 of steel, an endless chain may be employed to transmit the rotative power from the motor 5, the endless chain being trained around sprockets rather than the pulleys.

As better shown in FIG. 4, a pair of laterally spaced support plates 14, 15 is disposed above and extends along the respective support frames 2, 3. The support plates 14, 15 are mounted on the respective support frames 2, 3 by respective L-shaped bases 141, 151.

A plurality of arrayed shafts 16 are rotatably supported on an upper portion of the support plate 14 by respective bearings 17, the shafts 16 having axes extending perpendicularly to the feeding direction. A plurality of arrayed shafts 18 are fixedly supported on an upper portion of the support plate 15 in coaxial alignment with the shafts 16, respectively. The shafts 18 have respective outer ends fastened to the support plate 15 by respective nuts 19.

The shafts 16 have inner end portions or extensions 161 projecting toward the shafts 18, and drive support rollers 20 are fixedly mounted on the respective inner end portions 161. The fixed shafts 18 also have inner end portions or extensions on which driven support rollers 21 are rotatably supported. The drive and driven support rollers 20, 21 are spaced at intervals along the feed direction.

Figure 8:
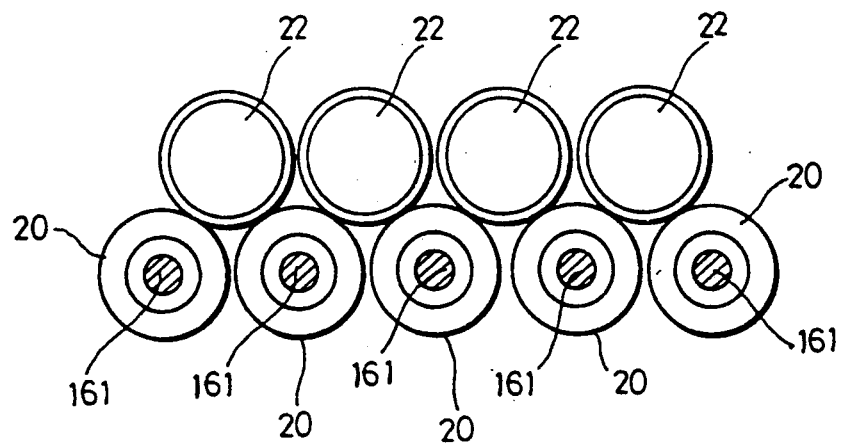
FIG. 8 is a cross-sectional view taken along line VIII—VIII of FIG. 4.

A plurality of feed rollers 22 are jointly supported on and placed between the drive and driven support rollers 20, 21. The feed rollers 22 extend axially between the drive and driven support rollers 20, 21 perpendicularly to the feeding direction. The feed rolls 22 have longitudinally opposite ends positioned between adjacent ones of the rollers 20, 21. Each of the feed rolls 22 has two points on its outer circumferential surface which are held against the outer circumferential surfaces of two adjacent rollers 20, 21, as shown in FIG. 8.

Figure 2:
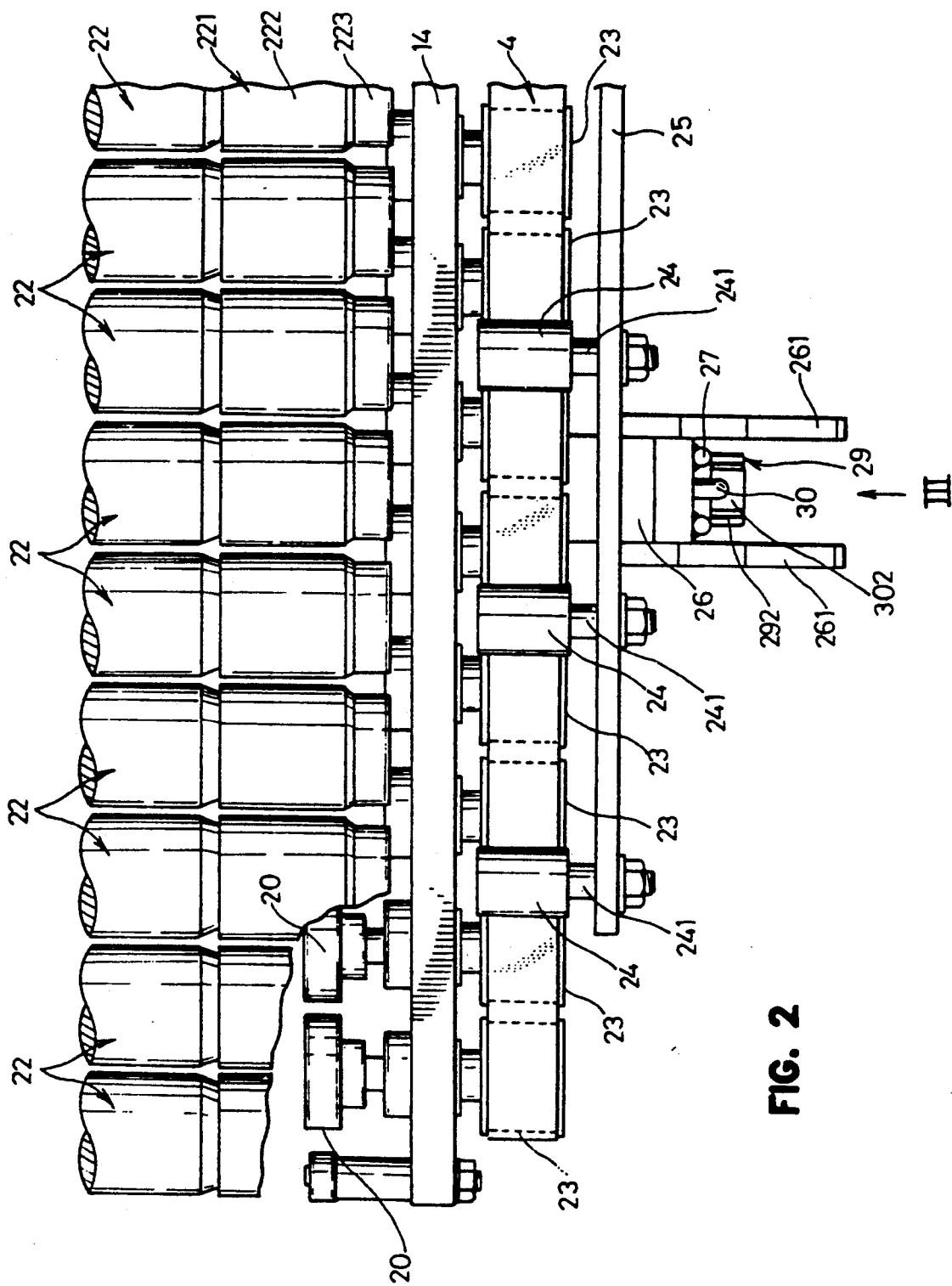
FIG. 2 is an enlarged fragmentary plan view of the horizontal sheet material conveyor apparatus.

As shown in FIGS. 2 and 4, roll caps 221, 224 are fitted over the axially opposite ends of the feed rolls 22. The roll caps 221, 224 have larger-diameter portions 222, 225, respectively, and smaller-diameter portions 223, 226. As shown in FIG. 8, the larger-diameter portions 222, 225 are placed between the drive and driven support rollers 20, 21, so that the rotative power from the drive support rollers 20 are transmitted through the larger-diameter portions 222 to the feed rolls 22 to rotate them.

To transmit the rotative power reliably to the feed rolls 20 without the possible slippage between the drive support rollers 20 and the feed rolls 22, each of the drive support rollers 20 is coated on its circumferential surface with a frictional layer 201 of rubber or the like.

Each of the drive support rollers 20 is positioned beneath and between two adjacent feed rolls 22, and each of the feed rolls 22 is supported in common by two adjacent drive support rollers 20. Therefore, the rotative power from one of the drive support rollers 20 is transmitted to two feed rolls 22 held in contact therewith. In this manner, the rotational speeds of the feed rolls 22 are equalized to each other.

The shafts 16 also have outer end portions or extensions 162, respectively, on which bearing rollers 23 are fixedly mounted. The drive support rollers 20 can therefore be rotated through the bearing rollers 23.

The bearing rollers 23 are rotated by a rotating mechanism described below.

Figure 7:
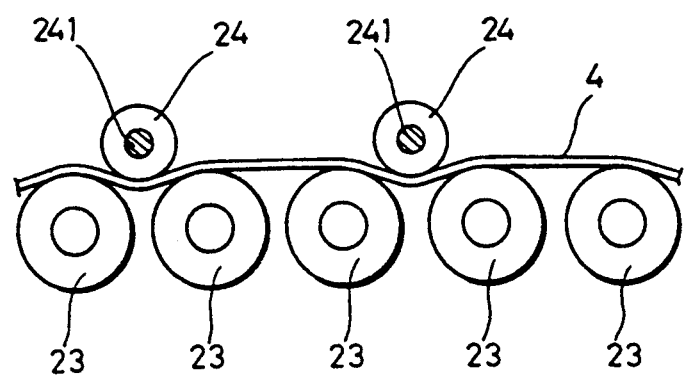
FIG. 7 is a cross-sectional view taken along line VII—VII of FIG. 4.

As shown in FIGS. 2 and 7, presser rollers 24 spaced at equal intervals are positioned between and above some of the bearing rollers 23, the intervals being larger than the distances between the drive support rollers 20 and also between the bearing rollers 23. The presser rollers 24 press the upper run of the belt 4 downwardly against the bearing rollers 23.

Figure 5:
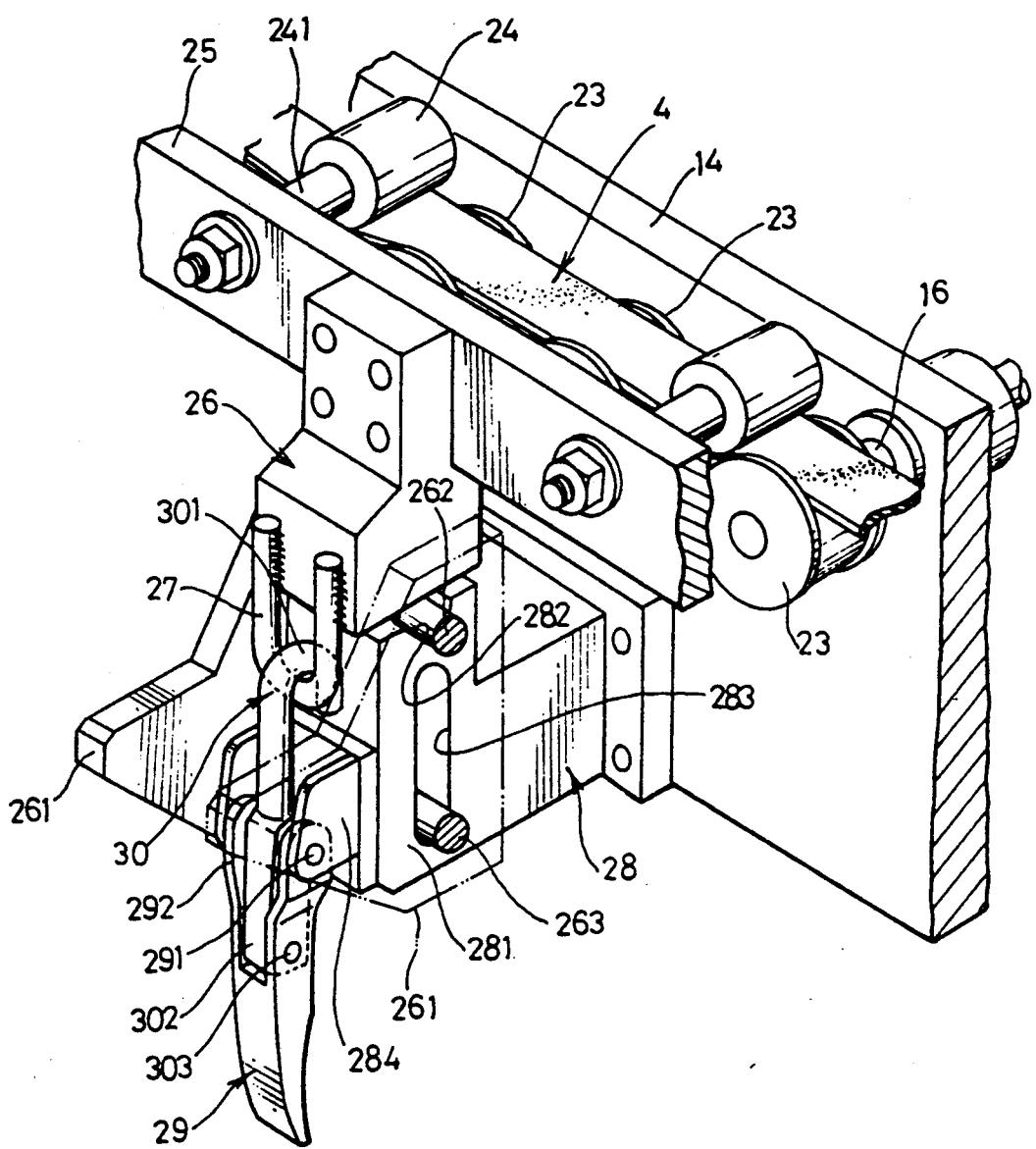
FIG. 5 is a fragmentary perspective view of a portion shown in FIG. 4, showing a mechanism for releasably locking presser rollers in pressing contact with an endless belt for transmission of rotative power to feed rollers.

The presser rollers 24 can be releasably locked in a position to press the belt 4 downwardly against the bearing rollers 23 by a mechanism described below. As shown in FIGS. 2 through 4, the presser rollers 24 are rotatably supported by respective support shafts 241 on a support plate 25 that extends in the feeding direction. As shown in FIG. 5, a block 26 is secured to and extends downwardly from the support plate 25, and a U-shaped catcher 27 is fixed to an outer end surface of the block 26. The U-shaped catcher 27 extends downwardly from the block 26, with its closed end down. Two spaced plate-like brackets 261 are fixed to respective opposite sides of the block 26 and have lower portions projecting outwardly, i.e., away from the support plate 25.

A substantially L-shaped block 28 (see FIGS. 4 and 5) is fixed to a lower outer surface of the support plate 14 and includes a vertically elongate distal end portion 281 having a substantially U-shaped lock groove 282 defined in an upper surface and a vertically elongate guide slot 283 defined in an intermediate portion thereof. A horizontal lock pin 262 extends between and is fixed to the brackets 261 immediately beneath the lower surface of the block 26, and similarly a horizontal guide pin 263 extends between and is fixed to the brackets 261 downwardly of the lock pin 262. The guide pin 263 extends through the guide slot 283.

A substantially U-shaped bracket 284 is fixed to a lower outer surface of the bracket 28, and a lever 29 has an upper end pivotally joined to the bracket 284 by a pin 291. The lever 29 has a bifurcated upper portion 292. A hook 30 has an upper end of an inverted U shape serving as an engaging finger 301 for engaging the catcher 27, and a lower portion 302 received in the bifurcated upper portion 292 of the lever 29. The lower portion 302 has a lower end pivotally coupled to the lever 29 by a pin 303 extending horizontally in the bifurcated upper portion 292, so that the hook 30 is pivotally mounted on the lever 29.

FIGS. 4 and 5 show that the presser rollers 24 are locked in the position to press the belt 4 against the bearing rollers 23. In this position, the lock pin 262 engages downwardly in the lock groove 282, and the hook 30 engages and pulls the catcher 27 downwardly, causing the presser rollers 24 to continuously press the belt 4 against the bearing rollers 23.

The belt 4 may be serviced or replaced in a manner described below.

Figure 6:
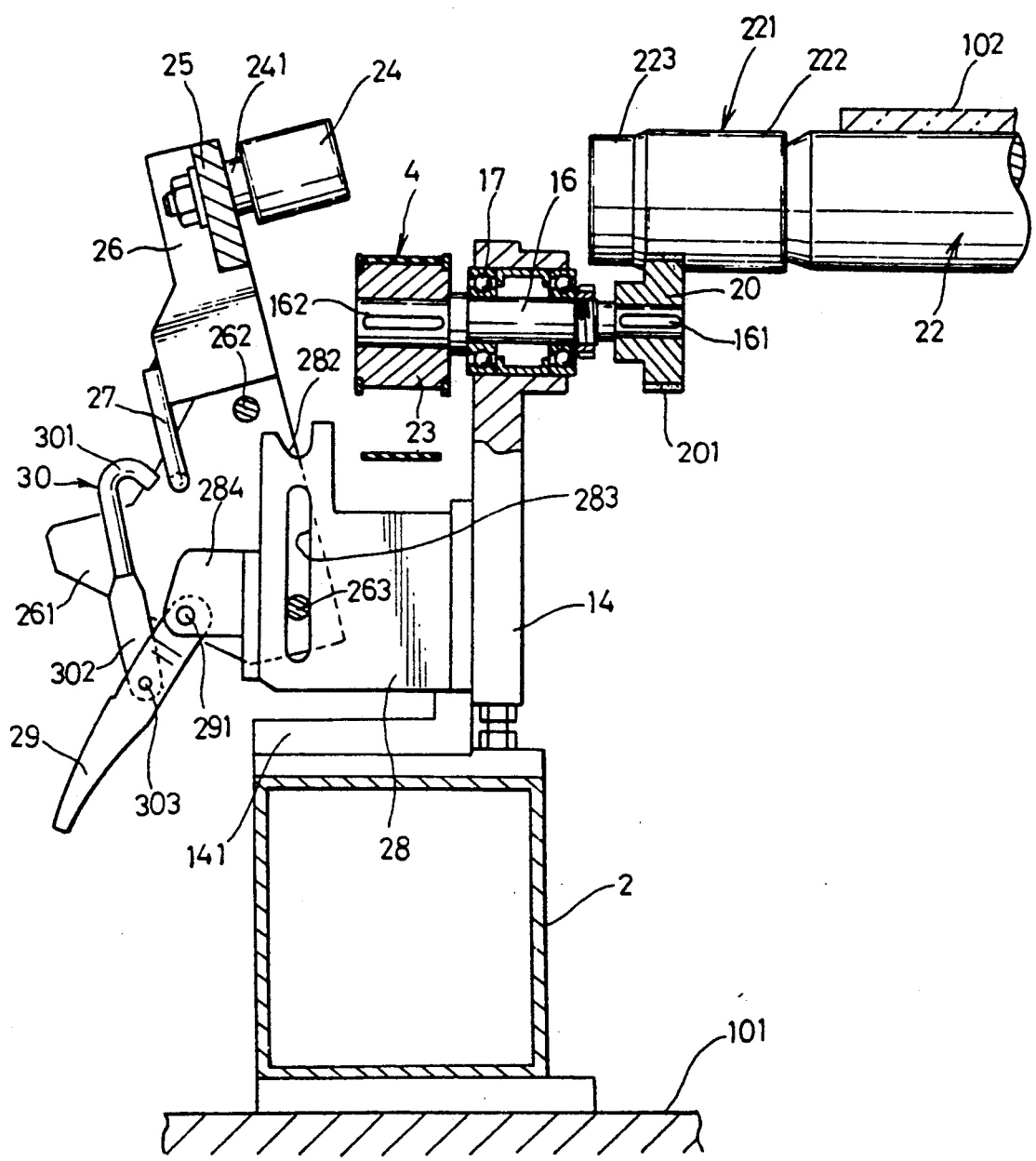
FIG. 6 is a fragmentary cross-sectional view of a portion shown in FIG. 4, showing the mechanism as being tilted to release the presser rollers out of contact with the endless belt.

First, the lever 29 is turned clockwise as indicated by the arrow in FIG. 4. The hook 30 pivotally coupled to the lever 29 moves upwardly out of engagement with the catcher 27. Thereafter, the brackets 261 are displaced upwardly to lift the lock pin 262 out of the lock groove 282. Then, the brackets 261, the block 26, and the support plate 25 are angularly moved outwardly about the guide pin 263 in the guide slot 283. As a result, the presser rollers 24 on the support plate 25 are elevated upwardly and outwardly away from the belt 4, as shown in FIG. 6. The belt 4 is now released from the pressed contact with the presser rollers 24, and its upper surface is freely accessible for servicing or replacement.

When the brackets 261, the block 26, and the support plate 25 are angularly moved back inwardly, and then the lever 30 is brought into engagement with the catcher 27 and pulled downwardly, the presser rollers 24 are locked again to press the belt 4 against the bearing rollers 23.

As shown in FIG. 4, a plurality of bearings 31 are mounted on an outer side surface of the support plate 15 on which the driven support rollers 21 are supported. A plurality of rods 32 having respective engaging grooves 321 defined in their respective outer circumferential surfaces are inserted in the respective bearings 31 whose axes extend horizontally. Screws 33 are radially threaded in the bearings 31 and have respective inner ends engaging in other engaging grooves 322 defined in the respective outer circumferential surfaces of the rods 32 and axially spaced from the engaging grooves 321. Therefore, the rods 32 are locked against axial movement. The rods 32 have respective inner portions loosely disposed in respective openings 152 defined in the support plate 15.

A plurality of joint plates 34 are fastened to the outer ends of the rods 32 by bolts 341, and a plurality of levers 342 are fixed to intermediate portions of the respective joint plates 34 in outwardly spaced relationship thereto. A plurality of position limiting rollers 35 are rotatably supported on upper ends of the joint plates 34 by respective bolts 351 and respective shafts (not shown). The position limiting rollers 35 engage in respective position limiting grooves 36 defined in the ends of the feed rolls 22 near the driven support rollers 21 for thereby positionally limiting the feed rolls 22 in their axial direction.

Each of the feed rolls 22 is also positionally limited in the feeding direction by a pair of drive support rollers 20 positioned one on each side of the feed roll 22 and a pair of driven support rollers 21 positioned one on each side of the feed roll 22.

The feed rolls 22 in the heating furnace 100 are axially expanded by the heat in the heating furnace 100. Such an axial expansion of the feed rolls 22 is allowed by the free ends of the feed rolls 22 near the drive support rollers 20.

When the motor 5 is energized, the endless belt 4 travels while it is being pressed against the bearing rollers 23 by the presser rollers 24. Therefore, the drive support rollers 20 coaxial with the bearing rollers 23 are rotated about the shafts 16, causing the bearing rollers 23 to rotate the feed rollers 22 about their own axes at a uniform speed.

If any one of the feed rolls 22 is damaged, then the damaged feed roll 22 should be located and replaced because the damage on the feed roll 22 would leave a corresponding mark on the sheet of glass 102.

Any damaged feed roll or rolls 22 can be located as follows: The screw or screws 33 corresponding to one particular feed roll 22 or a group of feed rolls 22 are loosened to unlock the rod or rods 32 from the bearing or bearings 31. Then, the lever or levers 342 are pulled away from the support plate 15. Since the position limiting roller or rollers 35 on the joint plate or plates 34 engage in the groove or grooves 36 of the feed roll or rolls 22, the feed roll or rolls 22 are axially moved to the right in FIG. 4 together with the lever or levers 342.

When the feed roll or rolls 22 are axially moved to the right in FIG. 4, the smaller-diameter portions 223, 226 of the roll caps 221, 224 thereof are placed onto the support rollers 20, 21. The feed roll or rolls 22 are therefore displaced downwardly out of engagement with the lower surface of the sheet of glass 102. If, at this time, no roll damage is transferred or marked on the sheet of glass 102, then since the lowered feed roll or rolls 22 have a damage, the feed roll or rolls 22 are replaced with a new feed roll or rolls.

The above locating and replacing process is efficient to effected because it is carried out without interrupting the feeding of the sheet of glass 102.

Figure 9:
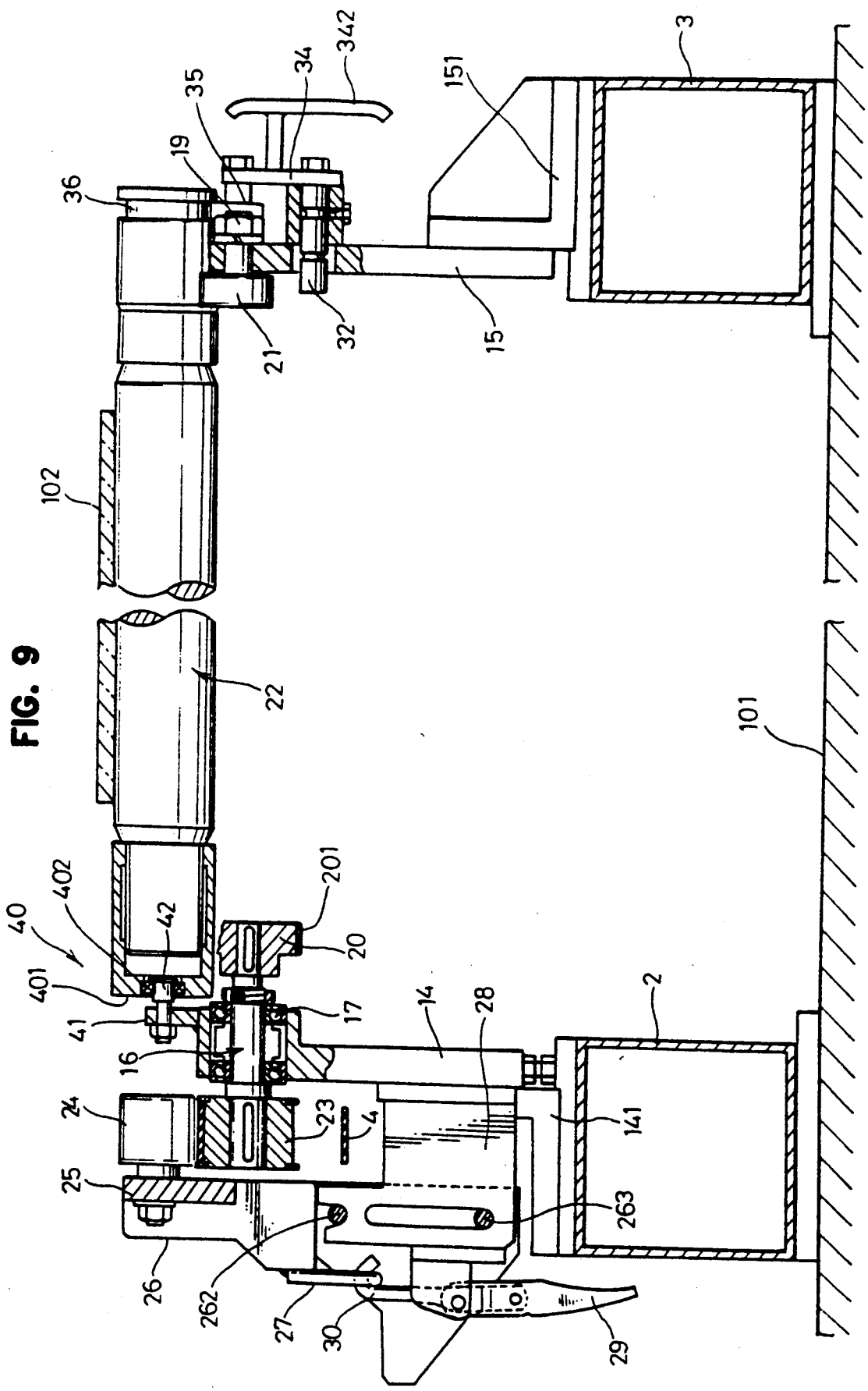
FIG. 9 is a view similar to FIG. 4, showing a horizontal sheet material conveyor apparatus according to another embodiment of the present invention.

FIG. 9 shows a horizontal sheet material conveyor apparatus according to another embodiment of the present invention. The horizontal sheet material conveyor apparatus shown in FIG. 9 differs from the horizontal sheet material conveyor apparatus according to the preceding embodiment with respect to the end structure of each of the feed rolls 2 near the drive support rollers 20. Those parts of the conveyor apparatus shown in FIG. 9 which are identical to those shown in FIGS. 1 through 8 are denoted by identical reference numerals, and will not be described in detail.

As shown in FIG. 9, a tubular roll cap 40 is splined over the end of each of the feed rolls 22 near the drive support roller 20 to allow axial movement of the feed roll 22. The roll cap 40 has a bottomed outer end 401 incorporating a bearing 402 therein. A pin 42 is horizontally supported on a vertical stay 41 mounted on the upper end of the support plate 14. The pin 42 has a distal end fitted in and held against the bearing 402 for limiting axial movement of the feed roll 22.

The horizontal sheet material conveyor apparatus is shown as being installed in the heating furnace in the above embodiments. However, only the feed rolls 22 may be positioned in the heating furnace 100, and the other components for rotating the feed rolls 22, including the endless belt 4, the motor 5, the support rollers 20, 21, and others may be positioned outside of the heating furnace 100.

The present invention offers various advantages given below.

Wince the drive support rollers 20 are rotated by the endless belt 4 driven by the motor 5 and the rotation of each of the drive support rollers 20 is transmitted to two adjacent feed rolls 22, the feed rolls 22 are rotated at uniform speed without speed irregularities which would otherwise be caused by the slippage of the feed rolls 22. Since all the feed rolls 22 are rotated at uniform speed, the sheet of glass 102 fed thereby is prevented from being damaged by the feed rolls 22 which would otherwise suffer speed variations.

The endless belt 4 is sandwiched under pressure between the presser rollers 4 and bearing rollers 23 fixed to the shafts 16 coaxially with the drive support rollers 20 that support ends of the feed rolls 22. Therefore, the drive power of the belt 4 can reliably be transmitted to the drive support rollers 20. The other ends of the feed rolls 22 are supported on the freely rotatable driven support rollers 21. Therefore, the drive support rollers 20 are disposed only on one side of the array of feed rolls 22. Accordingly, the mechanism for rotating the feed rolls 22 at uniform speed is relatively simple in structure.

The presser rollers 24 can be tilted about the guide pin 263 away from the belt 4 simply by unlocking the lever 29 and turning the brackets 261. Therefore, the belt 4 can simply be released out of driving relationship to the bearing rollers 23, and can easily be serviced and replaced.

When each of the feed rolls 22 is axially displaced, the larger- and smaller-diameter portions 222, 223, 225, 226 of the roll caps 222, 224 on the feed rolls 22 are selectively positioned on the drive and driven support rollers 20, 21. Therefore, the feed rolls 22 can easily be shifted between upper and lower positions to allow a damaged feed roll or rolls 22 to be located with ease.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

I claim:

1. A conveyor apparatus for feeding a sheet material, comprising:
    an array of feed rolls for feeding a sheet material in a feeding direction, said feed rolls having respective axes extending in a direction transverse to said feeding direction;
    a motor disposed on a side of said array of feed rolls;
    an array of drive support rollers disposed on said side of said array of feed rolls and operatively connected to said motor for rotation thereby;
    each of said drive support rollers commonly supporting adjacent two of said feed rolls for rotating the adjacent two feed rolls;
    an endless belt, said array of drive support rollers being operatively connected to said motor by said endless belt; and
    a plurality of bearing rollers fixed coaxially to and spaced axially from said drive support rollers, respectively, and a plurality of presser rollers disposed near outer circumferential surfaces of said bearing rollers, said endless belt being releasably sandwiched under pressure between said presser rollers and said bearing rollers.

2. A conveyor apparatus according to claim 1, further including a support member tiltable with respect to said drive support rollers, said presser rollers being rotatably supported on said support member upwardly of said drive support rollers, and a releasable lock mechanism coupled to said support member for tilting the support member for selectively pressing said presser rollers against said endless belt on said bearing rollers and releasing said presser rollers off said endless belt.

3. A conveyor apparatus for feeding a sheet material, comprising:
    an array of feed rolls for feeding a sheet material in a feeding direction, said feed rolls having respective axes extending in a direction transverse to said feeding direction;
    a motor disposed on a side of said array of feed rolls;
    an array of drive support rollers disposed on said side of said array of feed rolls and operatively connected to said motor for rotation thereby, each of said drive support rollers commonly supporting adjacent two of said feed rolls for rotating the adjacent two feed rolls;
    an array of driven support rollers disposed on an opposite side of said array of feed rolls and freely rotatably disposed coaxially with said drive support rollers, respectively, each of said driven support rollers commonly supporting adjacent two of said feed rolls;
    said feed rolls are axially movable, said feed rolls having larger- and smaller-diameter portions on each of both the axial ends thereof, said larger- and smaller-diameter portions of said feed rolls being selectively supported by said drive and driven support rollers.

4. A conveyor apparatus according to claim 3, further including position limiting means disposed on said opposite side of the array of feed rolls, for axially positionally limiting said feed rolls, said feed rolls having respective position limiting grooves defined in respective outer circumferential surfaces thereof, said position limiting means engaging in said position limiting grooves, respectively, and means for selectively disabling said position limiting means to allow said feed rolls to move axially.

5. A conveyor apparatus according to claim 4, wherein said feed rolls are axially positioned with respect to said drive and driven support rollers such that said larger-diameter portions are supported on said driven support rollers when said feed rolls are axially positionally limited by said position limiting means, and said smaller-diameter portions are supported on said driven support rollers, with said feed rollers displaced downwardly, when said position limiting means is disabled to allow the feed rollers to be axially moved.

* * * * *